[19] United States Patent
Withrington

[11] 3,940,204
[45] Feb. 24, 1976

[54] OPTICAL DISPLAY SYSTEMS UTILIZING HOLOGRAPHIC LENSES

[75] Inventor: Roger J. Withrington, Los Angeles, Calif.

[73] Assignee: Hughes Aircraft Company, Culver City, Calif.

[22] Filed: Jan. 23, 1975

[21] Appl. No.: 543,604

[52] U.S. Cl............ 350/3.5; 35/12 N; 350/162 ZP; 350/174
[51] Int. Cl.² .................... G02B 5/32; G02B 27/00
[58] Field of Search............... 350/3.5, 162 ZP, 174; 35/12 N

[56] References Cited
UNITED STATES PATENTS

| | | | |
|---|---|---|---|
| 3,633,988 | 1/1972 | Farrar | 350/3.5 |
| 3,653,736 | 4/1972 | Velzel | 350/3.5 |
| 3,737,212 | 6/1973 | Antonson et al. | 350/3.5 |
| 3,807,829 | 4/1974 | Close | 350/3.5 |

Primary Examiner—Ronald J. Stern
Attorney, Agent, or Firm—W. H. MacAllister; Walter J. Adam

[57] ABSTRACT

This invention is applicable to display systems, such as in a helmet mounted display or a head-up display, utilizing a holographic lens operating at a relatively large off-axis angle in order to perform the dual function of a combiner glass and an eyepiece. The holographic lens is used in conjunction with more conventional optical elements (lenses, mirrors and prisms) to present a high quality collimated virtual image of an object, such as the face of a cathode ray tube, to an observer. The aberrations inherent in a holographic lens constructed to operate at a large off-axis angle and with a large field of view are corrected both by constructing the holographic lens with aberrated wavefronts and by the optical elements used in conjunction with the holographic lens during playback. Some arrangements of the playback systems of the invention include a relay lens having cylindrical surfaces and tilted and/or decentered elements used to compensate for the axial astigmatism and axial coma in the holographic lens. The holographic lens is constructed with aberrated wavefronts primarily in order to correct a large assymetric variation of astigmatism across the field of view which arises because of a difference in tilt of the two image fields corresponding to the two mutually orthogonal line focal surfaces. The tilts of the two image fields are adjusted relative to one another in such a way that they may both be matched by a single tilt of the object surface.

The invention herein described was made in the course of or under a Contract or Subcontract thereunder with the Department of the Air Force.

25 Claims, 20 Drawing Figures

Top View

OPTICAL DISPLAY SYSTEMS UTILIZING HOLOGRAPHIC LENSES

BACKGROUND OF THE INVENTION

1. Field of the Invention

This invention relates to display systems utilizing holographic lenses and more particularly to a display system incorporating a holographic lens constructed with aberrated wavefronts which is used in conjunction with other optical elements including cylindrical, tilted and decentered surfaces to provide correction of the aberrations in the holographic lens.

2. Description of the Prior Art

Previously, optical systems utilizing holographic lenses have been designed with good image quality over small fields of view and poor image quality over large fields of view. Also, optical systems utilizing holographic lenses have been required to operate at relatively small off-axis angles because of the aberrations inherent in a holographic lens utilizing large off-axis angles. Aberrations arise for the on-axis image point in a holographic lens designed for a large field of view because the wavefront used in the reconstruction process is not identical to either construction beam. This arises because there is a pupil-to-pupil relationship between the construction beam sources while an object-to-image relationship must hold upon reconstruction. The holographic lens is constructed with coherent sources located close to or at the desired entrance and exit pupil locations of the holographic lens so that the Bragg condition is met for the chief rays, thus providing a high reconstruction efficiency across a large field of view. The principal aberrations in a holographic lens constructed as above and operating at a relatively large off-axis angle are axial astigmatism, axial coma and an assymetric variation of coma and astigmatism across the field. In addition there is a considerable amount of field tilt and distortion. The assymetric variation of astigmatism arises principally because the field tilt for fans of rays traced in a vertical plane is different from the field tilt for fans of rays traced in a horizontal plane. Unless compensation is provided for the aberrations in the holographic lens operating at a relatively large off-axis angle, the display provides a very poor image quality that may be unsatisfactory for operations such as helmet-mounted displays or aircraft head-up displays.

SUMMARY OF THE INVENTION

Briefly, this invention is a display system such as a helmet-mounted display or a head-up display utilizing a holographic lens operating at a relatively large off-axis angle and with a relatively large field of view. The observer looks through the holographic lens at a scene which is a collimated virtual image of an object surface projected through optics including a relay lens. The holographic lens is constructed with aberrated wavefronts to minimize the variation of astigmatism across the field, the aberrated wavefronts being obtained by means such as by placing tilted cylindrical elements in the hologram construction optics. The relay lens may contain cylindrical surfaces which primarily permits the compensation of the axial astigmatism in the holographic lens. The relay lens may also include a prism system, tilted glass plates or lenses, or decentered lenses to compensate for axial coma in the holographic lens.

OBJECTS OF THE INVENTION

It is therefore an object of this invention to provide a display system having good image quality over relatively large fields of view and obtained by utilizing a holographic lens in conjunction with other optical elements.

It is another object of this invention to provide a display system in which an image of an object is collimated by a holographic lens to provide a high quality image of the object located at infinity and clearly viewable by an observer located at the exit pupil of the holographic lens.

It is another object of this invention to provide a high quality display system utilizing a holographic lens operating at a relatively large off-axis angle in conjunction with other optical elements.

It is another object of this invention to provide a holographic helmet-mounted display that provides good image quality while operating at a relatively large off-axis angle and having a relatively large field of view.

It is still a further object of this invention to provide a holographic head-up display that provides good image quality while operating at a relatively large off-axis angle and having a relatively large field of view.

BRIEF DESCRIPTION OF THE DRAWINGS

The novel features of this invention as well as the invention itself both as to its organization and method of operation, will best be understood from the accompanying drawings, taken in connection with the accompanying description, in which like reference characters refer to like parts in which:

FIG. 18a is a schematic diagram of the holographic lens construction optics for the head-up display of FIG. 13.

FIG. 18b is a perspective of the tilted cylindrical lens of FIG. 18a to show that the curved surface is seen in a side view orthogonal to FIG. 18a.

DESCRIPTION OF THE PREFERRED EMBODIMENT

Figure 1:
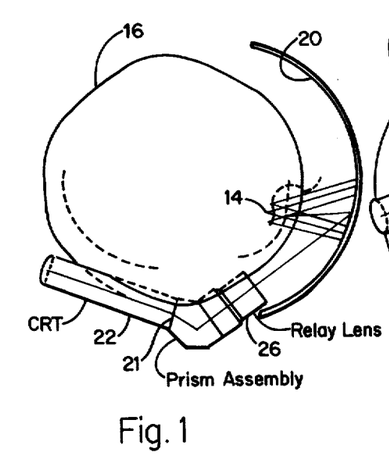
FIG. 1 is a schematic top view of a holographic visor helmet-mounted display in which the principles in accordance with the invention may be utilized.
Figure 2:
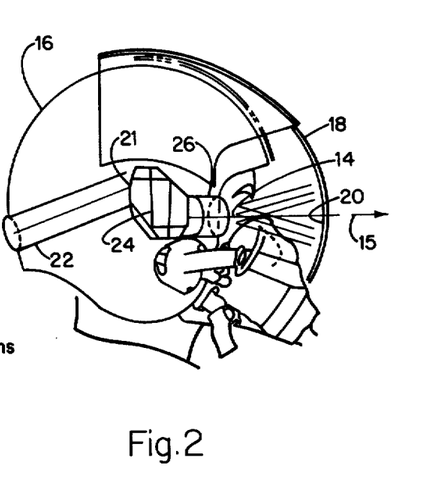
FIG. 2 is a side view of the holographic visor helmet-mounted display of FIG. 1.

Referring first to FIGS. 1 and 2 which show a holographic visor helmet-mounted display as an illustrative example in which the concepts of the invention may be utilized, the pilot of an aircraft, for example, with a helmet 16 is provided a display of symbols from an object surface 21 combined with a clear view of the outside scene as indicated by an arrow 15 from his eye at an exit pupil 14. The helmet 16 includes a visor 18, an integral part of which is a holographic lens 20 constructed with aberrated wavefronts in accordance with the invention. The holographic lens operates in the reflection mode.

Figure 3:
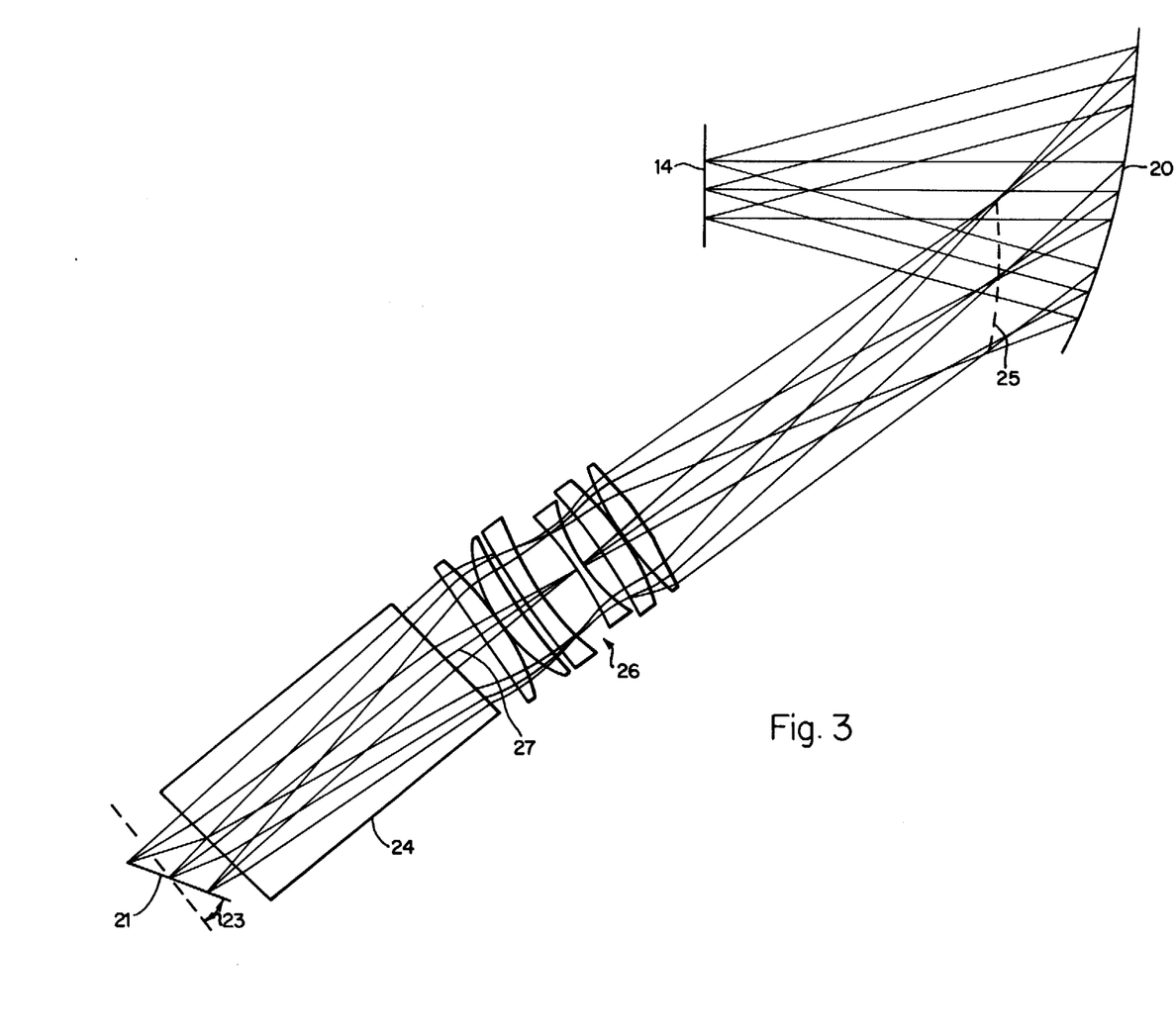
FIG. 3 is a schematic diagram of a top view showing the ray traces for the helmet-mounted display.

Referring also to FIG. 3, as well as to FIGS. 1 and 2, the principal optical components of the system are a prism assembly 24 (shown unfolded in FIG. 3), a relay lens 26, and the holographic lens 20, which is an intergral part of the visor and may be on the inner surface thereof. The object plane 21 which may be the face of a cathode ray tube (CRT) 22 having a narrow wavelength band phosphor, is tilted by an angle 23 with respect to the normal to the axial ray 27 of the system. An aberrated intermediate image 25 of the object plane 21 is formed at the focal surface of the holographic lens 20 by imaging said object plane 21 through the prism assembly 24 (shown unfolded in FIG. 3), and the relay lens 26. An image of said object plane is subsequently formed at infinity by the holographic lens 20 which is used as an eyepiece. The holographic lens 20 has aberrations which balance the aberrations in the intermediate image so that the collimated image viewed by the pilot's or observer's eye located at the exit pupil 14 is of high quality.

It is to be noted that tilting the object surface in the system optics is known in the prior art such as in U.S. Pat. No. 2,187,803 and is not parts of this invention. Although the principles of the invention are illustrated in systems utilizing a holographic lens operating in the reflective mode, it is to be understood that they are equally applicable to optical systems utilizing a suitable holographic lens, arranged in a configuration to operate in the transmissive mode. The field of view presented to the eye at the exit pupil 14 may be relatively large in the system of the invention such as for example a 30 degree conical field of view. The exit pupil diameter may also be relatively large such as for example 12 to 15 mm (millimeters). The wavelength band within which the holographic lens 20 will diffract light with a high optical efficiency is narrow since the holographic lens operates according to the well-known laws of Bragg diffraction. The holographic lens therefore has a high transmittance outside the narrow band reflected from the object plane, thus permitting the pilot to view the outside scene at the same time as viewing the display.

Figure 4:
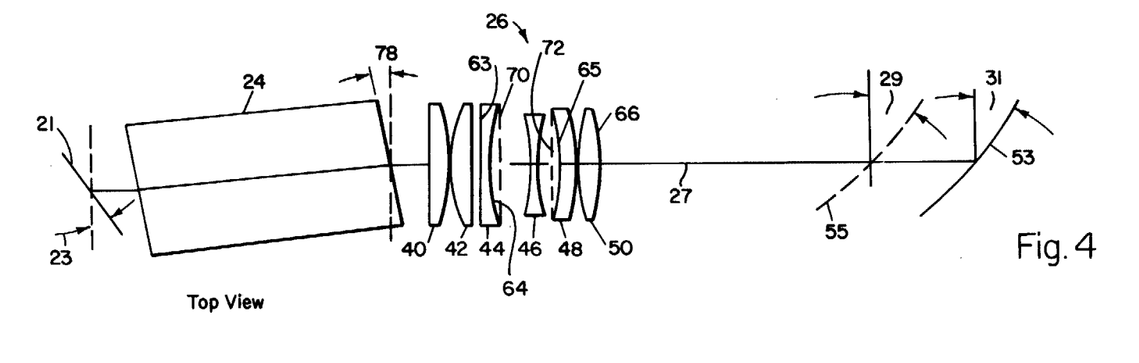
FIG. 4 is a schematic top view of the optical system for explained aberrations that may be provided in the helmet display system of the invention.

Referring now also to the schematic top view of FIG. 4 which shows the optics preceding the holographic lens, the light rays pass from the object plane 21 of the cathode ray tube 22, and then pass through the prism assembly 24 which includes prisms having wedges attached thereto to provide the optical equivalent of a glass plate which is tilted by an angle 78 with respect to the normal to the axial ray. This tilt causes axial coma in the intermediate image, the magnitude of which balances axial coma in the holographic lens 20. The relay lens 26 includes cylindrical surfaces 63, 64, 65 and 66 which cause axial astigmatism in the intermediate image. Some axial astigmatism is also caused by the tilted glass plate equivalent of the prism assembly 24. The total axial astigmatism introduced by the tilted prism assembly 24 and the cylindrical surfaces in the relay lens 26 balances the axial astigmatism in the holographic lens 20. Both axial coma and axial astigmatism in the holographic lens are thus corrected by introducing values of equal and opposite sign to the intermediate image by means of the tilted prism assembly and the cylindrical surfaces in the relay lens. The residual axial coma and astigmatism in the image seen by the eye is hence very small and the image is of a high quality.

The axial coma, which is a measure of the degree of symmetry in the aberrated intermediate image of the central point of the object plane, may alternatively in accordance with the invention be compensated for by tilting and/or decentering one or more of the lens elements in the relay lens 26. Tilting and/or decentering of lens elements in the relay lens 26 may also be performed in conjunction with tilting the prism assembly 24 which is the method used in the example to correct the axial coma.

Figure 5:
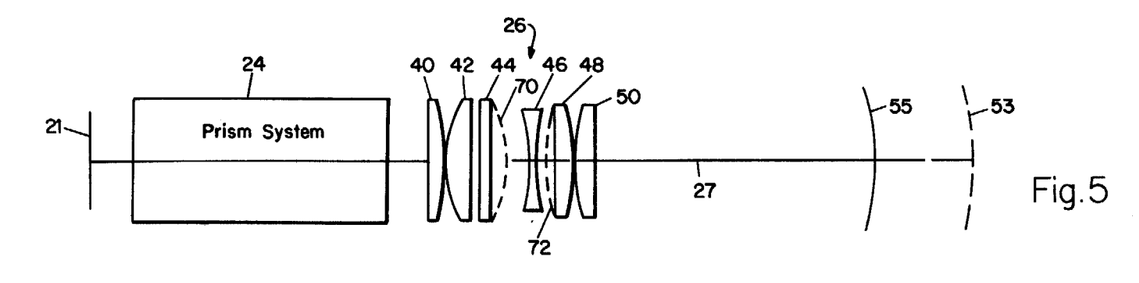
FIG. 5 is a schematic diagram of a side view of the optical system of FIG. 3.

Referring now also to FIG. 5 as well as to FIG. 4, the relay lens 26 in the illustrated arrangement includes a positive spherical lens 40, a positive spherical lens 42, a negative cylindrical lens 44, a negative spherical lens 46, a positive sphero-cylindrical lens 48 and a positive sphero-cylindrical lens 50. A sphero-cylindrical lens is a lens with a spherical surface on one side and a cylindrical surface on the other. The cylindrical surfaces on the lenses 44, 48 and 50 in the illustrated arrangement provide a negative power. In the top view of FIG. 5, the net power of the relay lens 26 is therefore less than the net power of the relay lens in the side view of FIG. 5. Fans of rays traced in the plane of FIG. 5 from the object plane 21 through the prism assembly 24 and relay lens 26 come to a focus at the horizontal line focus 55 of the intermediate image 23. Fans of rays traced in the plane of FIG. 4 which is mutually orthogonal to the plane of FIG. 5, come to a focus at the vertical line focal surface 53. Because the relay lens has less power in the plane of FIG. 4, the focal surface 53 is located further from the relay lens than the focal surface 55. The focal surfaces 53 and 55 are shown as lines that are sections through the surface in that view although the total projection would be a circle like the field of view. The distance between the two focal surfaces 53 and 55 along the axial ray 27 is the longitudinal axial astigmatism which is in the holographic lens. The cylindrical surfaces which are curved only in the top view of FIG. 4 are surfaces 63, 64, 65 and 66. These curved surfaces combine to have a negative power, but it is to be understood that the principles of the invention are not limited to the use of negative cylindrical lenses. Positive cylindrical lenses may also be used such as by rotating one or more of the cylindrical surfaces through 90° so that the effective curvature of the cylindrical lenses would be in the side view of FIG. 5, such as is indicated by the dashed surfaces 70 and 72 in FIGS. 4 and 5. This use of a positive cylindrical lens may be done provided the two pairs of conjugates at which the relay lens 26 is used in the views of FIGS. 4 and 5 are such that the focal surface 53 is further from the relay lens than the focal surface 55 and that the curvatures of all the surfaces are adjusted to maintain the proper balance of the aberrations in the system. It is also to be noted from FIGS. 4 and 5 that the tilt indicated by the angle 78 of the prism assembly 24 is in the plane of FIG. 4 so that the axial coma is only in the vertical line focus 53 of the intermediate image. This coma condition is consistent with the bi-symmetrical nature of the unfolded optical system (FIG. 3), the system being symmetrical about a horizontal plane containing the axial ray 27 so that the asymmetric aberration of axial coma is not present in the axial fan of rays traced in the vertical plane or section. It is to be understood that this invention is not limited to an orientation wherein the plane about which there is symmetry is horizontal. Horizontal and vertical are used in this description only as a means to identify the mutually orthogonal planes of interest in the bi-symmetrical optical system being described.

In FIGS. 4 and 5, it is to be noted that the positive lens group of lens elements 40, 42 and 44 used in conjunction with the negative lens 46 and the positive lens group of the lens elements 48 and 50 results in a relay lens derived from the well-known triplet design. In this design from, the powers and spacings of the two positive lens groups from the central negative lens 46 are used to control field curvature. In the illustrated example, these powers and spacings are used to match the intermediate image field curvature to the field curvature in the holographic lens.

Figures 6, 9, 10:
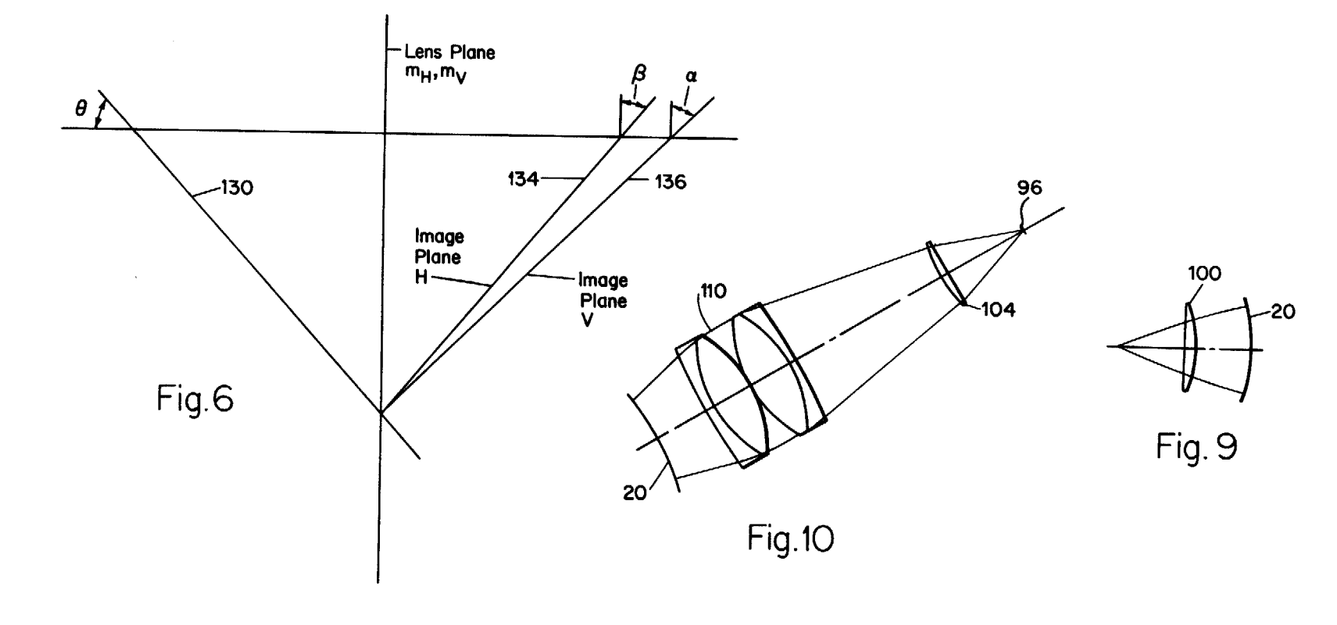
FIG. 6 is a schematic diagram of Schiemflugh's condition for explaining the relation of the tilts of the two image planes that may be corrected in the construction of the holographic lens.
FIG. 9 is a schematic diagram of a side view of the construction arrangement of FIG. 7 for the object beam system.
FIG. 10 is a side view for the reference beam system of the optical construction arrangement of FIG. 7.

Referring now to FIGS. 4 and 6, the object surface is tilted by the angle 23 relative to the normal to the axial ray 27. The intermediate image focal surfaces 55 and 53 are therefore also tilted by respective angles 29 and 31, with respect to the normal to the axial ray 27, these tilts being required to match the tilts of the two corresponding focal surfaces of the holographic lens. These two focal surfaces are separated by an amount equal to the axial astigmatism. However, in order to obtain high image quality across a large field of view, the two focal surfaces of the holographic lens and the two intermediate image focal surfaces must not only match in separation, but also in tilt and curvature. In the first order, the tilts of the two intermediate image surfaces are related by Schiemflugh's condition to the tilt of the object plane, as illustrated in FIG. 6 where the relay lens is represented as being thin. Because the relay lens has less power in the horizontal plane of FIG. 4 than in the vertical plane of FIG. 5, the magnification between the object and image planes is different in the two planes. If $\theta$ is the tilt of the object plane, and $m_H$ and $\alpha$ are the relay lens magnification and intermediate image tilt for fans of rays traced in the plane of FIG. 4, then Schiemflugh's condition requires that $\tan \alpha = m_H \tan \theta$ Similarly, $\tan \beta = m_V \tan \theta$ so that
$m_V \tan \alpha = m_H \tan \beta$ (1)

The terms $m_V$ and $\beta$ are respectively the relay lens magnification and intermediate image tilt for fans of rays traced in planes orthogonal to FIG. 4. Equation (1) gives the first order relationship between the tilts of the two intermediate image focal surfaces based on Schiemflugh's condition which requires that in the plane of FIG. 6, lines drawn through the object plane 130, lens plane 132 and the two image surfaces 134 and 136 must intersect at the same point assuming the relay lens to be thin. Because $m_H$ is not necessarily equal to $m_V$, $\alpha$ is not equal to $\beta$ and the two focal surfaces are not necessarily parallel to one another. The relationship between the two tilts is fixed for a given relay lens and this relationship is matched in the holographic lens 20 by constructing said holographic lens with aberrated wavefronts.

Figure 7:
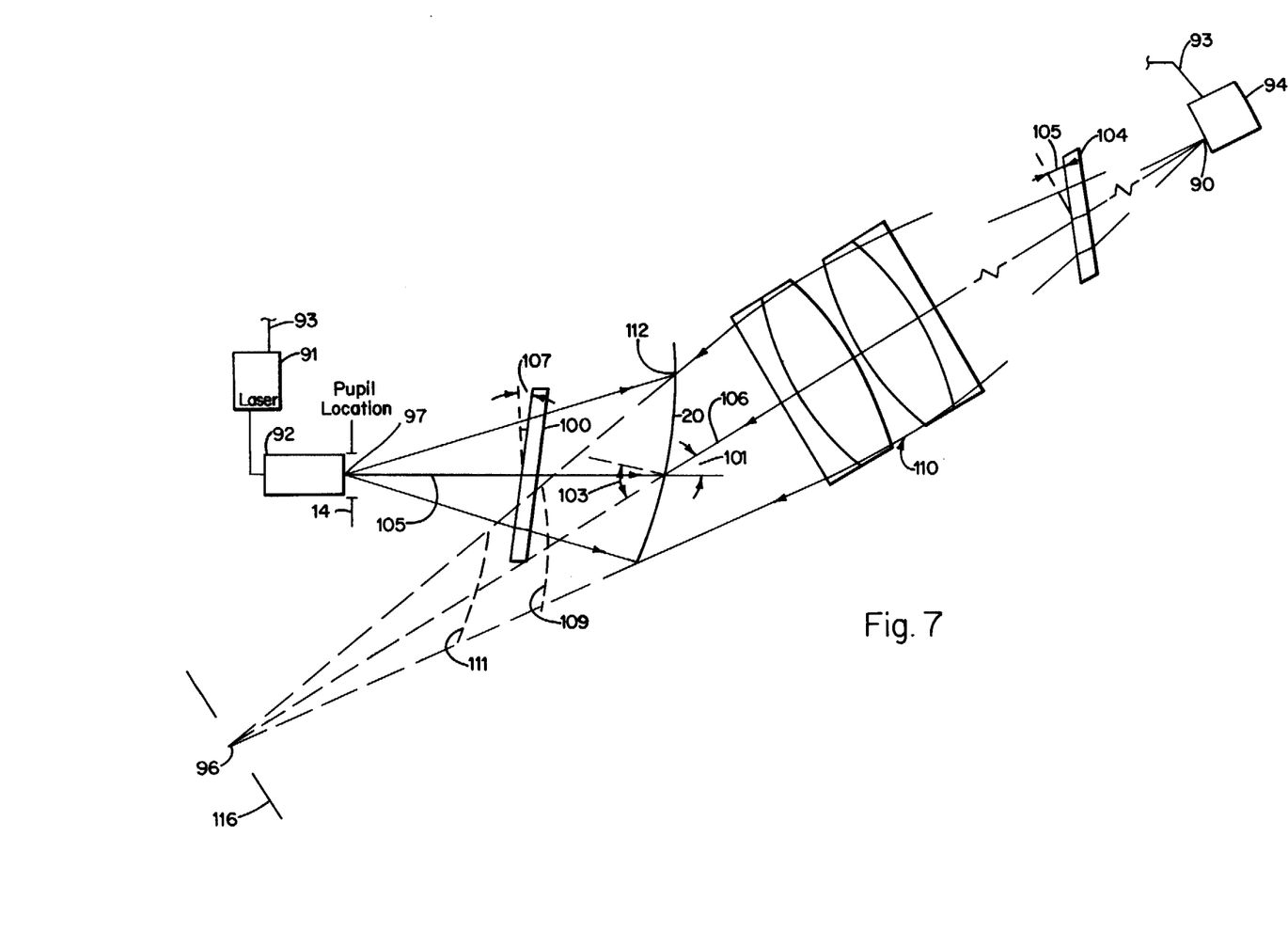
FIG. 7 is a schematic diagram of a top view of the hologram construction arrangement that may be utilized to provide the holographic lens for the helmet-mounted display.

Referring now to FIG. 7 which shows the optical system used to construct the holographic lens, the holographic lens 20 is constructed with two aberrated wavefronts derived from two mutually coherent point sources 97 and 90 being termed the object and reference beam point sources respectively for the purposes of identification only in the illustrated example. As is well known in the art, these two point sources may be derived from the same laser 91 (as indicated by the line 93 and rectangles 92 and 94) utilizing suitable optical components including a beam-splitter, microscope objectives and spatial filters. As is also well known in the art, the holographic lens is a recording of the interference pattern between the two coherent wavefronts derived from the two sources 97 and 90. The recording may be made by any of the well-known techniques which, for example, may use a dichromated gelatin or photographic material with appropriate processing. It is to be understood that the optical design principles which are the subject of this invention are within the scope of this invention regardless of the methods used to record and process the holographic lens or the optical means used to obtain the two coherent point sources 90 and 97.

In FIG. 7, the object beam point source 97 is located at or close to the desired exit pupil location 14 of the optical system. The reference beam point source 90 is imaged by the imaging lens 110 at the point 96 which is close to or at the desired location of the relay lens exit pupil 116. It is to be noted that the point 96 is chosen to be close to the center of the desired relay lens location so as to minimize the diameter of the relay lens. It is also to be noted that the distances $R_o$ and $R_R$ of the respective points 97 and 96 from the holographic lens substrate determine the paraxial focal length, $f_H$, of the holographic lens by the well-known equation $$\frac{1}{f_H} = \mu \left( \frac{1}{R_o} + \frac{1}{R_R} \right)$$ (2)

where $\mu$ is the ratio of the wavelength used to construct the hologram to the wavelength used in playback. It is particularly important to note that the points 97 and 96 are located close to the desired entrance and exit pupil locations of the holographic lens so that there is a high reconstruction efficiency for all the chief rays, thus providing a bright image for all field angles. In the illustrated example, the object beam incident on the surface 20 which is to be the holographic lens is diverging from the point 97, whereas the reference beam is converging on the point 96. It is well known that the direction of these two beams may be reversed. It is within the scope of this invention that the optical principles disclosed are applicable to both the illustrated example and the case in which the direction of the two beams is reversed, so that the reference beam diverges from the point 96 and the object beam passes through an imaging lens to converge on the point 97. It is also within the scope of this invention that the principles disclosed apply equally to the case of a transmission holographic lens. The illustrated example is a reflection holographic lens wherein the two beams used to construct said lens are incident on said lens from opposite sides of the lens substrate. In a transmission hologram, both beams would be incident from the same side. It is also within the scope of this invention that the optical principles disclosed do not depend on the optical design form of the imaging lens 110. The imaging lens 110 may be one of many design forms and is only required to have a sufficient aperture to illuminate the hologram, and to image the reference beam point source 90 at the point 96.

The construction of the holographic lens with point sources located close to the desired entrance and exit pupil locations of the lens is a significant departure from the well-known construction geometry by which perfect axial imagery is obtained. The geometry for perfect axial imagery requires the same relationship between the two construction point sources as the desired object to image locations, however, this geometry is not suitable for a large field of view because of efficiency considerations. The departure from the perfect axial imagery geometry for constructing the holographic lens with high efficiency across a large field of view causes axial aberrations in the holographic lens. The principle axial aberrations are axial coma and axial astigmatism which are balanced by the aberrations introduced to the intermediate image by means of the tilted prism assembly and the cylindrical surfaces in the relay lens. Because the holographic lens is used at a large off-axis angle 101 and large assymmetry angle 103 the magnitude of the coma and astigmatism is large. In particular, the axial astigmatism in the holographic lens of the illustrated example may be as large as 50% of the focal length of the holographic lens causing two well separated focal surfaces 53 and 55 (FIG. 4) on playback.

As a result of the off-axis geometry, also it is to be noted that the focal surfaces 109 and 111 of the holographic lens are tilted with respect to the normal to the axial ray, and the tilt of the focal surface for horizontal lines is not necessarily equal to the tilt of the focal surface for vertical lines. If the holographic lens were not constructed with aberrated wavefronts, these tilts would be as large as about 63 degrees and 45 degress for the horizontal line focal surface 111, and the vertical line focal surface 109 respectively. These tilts are so largely different that they could not maintain the condition specified in Equation 1 for both tilts to be matched by a single tilt of the object surface imaged through the relay lens and prism assembly. In the illustrated example, the holographic lens is therefore constructed with aberrated wavefronts obtained by placing tilted cylindrical lenses 100 and 104, one in each construction beam. Adjusting the powers and tilt angles 105 and 107 of these lenses permits the tilt of the horizontal line focus to be varied relative to the tilt of the vertical line surface. In the illustrated example, the object surface is therefore tilted so that the tilt angle 31 of the vertical line focal surface 53 in FIG. 4 in the intermediate image equals the tilt of the vertical line focal surface 109 of the holographic lens. The tilt of the horizontal line focal surface 111 of the holographic lens is then adjusted to match the tilt of the horizontal line focal surface in the intermediate image which corresponds to the tilt of the object surface by adjusting the tilts and powers of the cylindrical lenses used to construct the holographic lens.

Figure 8A:
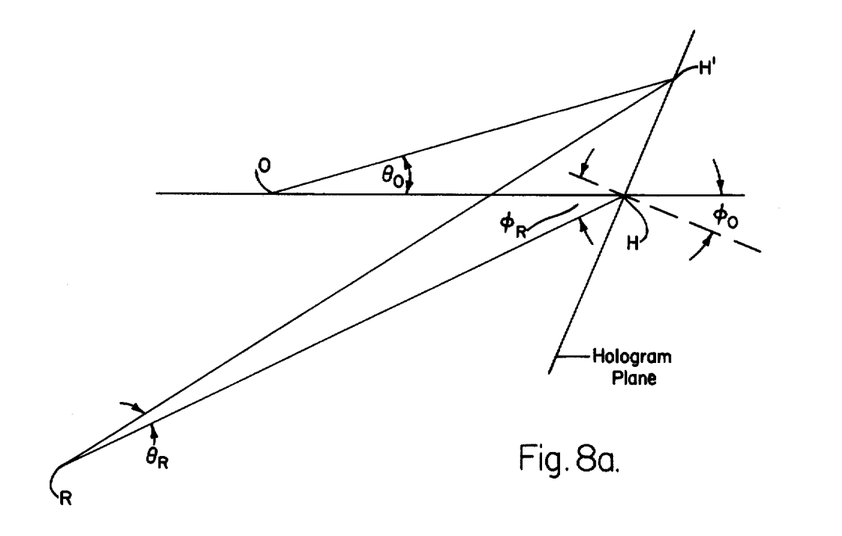
FIGS. 8a and 8b are schematic top views of the holographic helmet display respectively for construction and playback for further explaining the image plane characteristics.
Figure 8B:
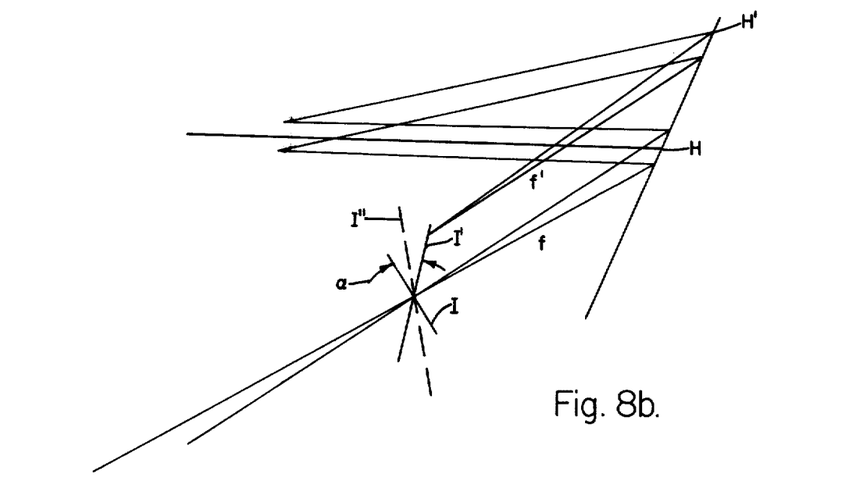

Referring now to FIGS. 8a and 8b, the principle whereby the tilt adjustment of the horizontal line focus is obtained by constructing the holographic lens with aberrated wavefronts is explained. The principle is explained in a simplified manner for purposes of understanding only. Consider a holographic lens on a plane substrate which is to be constructed and used on playback at the same wavelength. Points 0 and R in FIG. 8a are the construction point sources and the desired exit pupil is to be located at 0. Points H and H' are localized areas on the holographic lens which are used to image the axial ray bundle and a ray bundle at the field angle $\theta_0$ at the points I and I' in the focal surface of the lens as shown by the playback diagram of FIG. 8b. Although points H and H' are parts of the same holographic lens, let them be considered to be two separate holograms of focal lengths $f$ and $f'$ where $$\frac{1}{f} = \frac{1}{R_o} + \frac{1}{R_R} (R_o = OH, R_R = RH)$$

and $$\frac{1}{f'} = \frac{1}{R_o'} + \frac{1}{R_R'} (R_o' = OH', R_R = RH')$$

If now $f'$ is increased without changing $f$, I' moves to I'' and the tilt, $\alpha$ of the focal surface is decreased. This can be done by changing the conjugates at which the holographic lens is constructed, as indicated by the following trigonometrical relationships:

In triangles OH'H and RH'H, the sin formula gives
$R_o' = R_o \cos \phi_o / \cos (\phi_o + \theta_o)$
$R_R = R_R' \cos \phi_R / \cos (\phi_R + \theta_o)$
so that $$\frac{1}{f'} = \frac{1}{R_o'} + \frac{1}{R_R'}$$
$$= \frac{1}{f} - \left[ \frac{1}{R_o} \tan \phi_o \, d\theta_o + \frac{1}{R_R} \tan \phi_R \, d\theta_R \right]$$

where Equation 1 and the small angle approximation has been used for $\theta_0$ and $\theta_R$. The change in power, $\Delta K$, between the points H and H' is therefore given by $$\Delta K = \frac{1}{f} - \frac{1}{f'} = \frac{1}{R_o} \tan \phi_o \, d\theta_o + \frac{1}{R_R} \tan \phi_R \, d\theta_R$$

This equation can be further expressed in terms of HH' by the expression $$\Delta K = \frac{1}{f} - \frac{1}{f'} = HH' \left[ \frac{\sin \phi_o}{R_o^2} + \frac{\sin \phi_R}{R_R^2} \right]$$

The change in power, and therefore focal length, between points H and H' is hence shown to be a function of $R_o$ and $R_R$, which are the conjugates used to construct the hologram. Since the change in power causes a change in the tilt of the focal surface relative to the axial ray, it may be concluded that the tilt of the focal surface is a function of the conjugates at which the hologram is constructed.

Referring now to FIGS. 9 and 10 as well as to FIG. 7, this principle is used in the illustrated example to adjust the tilt of the horizontal line focal surface relative to the tilt of the vertical line focal surface by constructing the holographic lens at different conjugates for fans of rays traced in the vertical plane than the conjugates used to construct the holographic lens for fans of rays traced in the horizontal plane. The means used to construct the holographic lens at two different pairs of conjugates for the two orthogonal planes of interest is to insert a positive cylindrical lens or lens combination into each construction beam. The orientation of these cylindrical lenses 100 and 104 is vertical, FIGS. 9 and 10, and therefore effects the construction of the holographic lens for fans of rays traced in the vertical section. The effect of the cylindrical lenses 100 and 104 is therefore to reduce the tilt of the horizontal line focal surface from about 63° to about 45° in the illustrated example. Tilt correction can also be obtained by placing a cylindrical lens in only one of the construction beams, however, this changes the focal length of the hologram in the plane of the cylindrical surface and can lead to an undesirably large amount of astigmatic pupil aberration in the system on playback.

It should be noted that it has also been found by computer ray tracing that tilting the cylindrical lenses used in the construction of the holographic lens has a significant effect on the tilt of the focal surface. The tilt is in the plane of FIG. 7 which is orthogonal to the plane containing the cylindrical curvature of the lenses 100 and 104. This causes a variation in focal length across the horizontal section of the holographic lens for vertical fans which in turn effects the tilt of the horizontal line focus.

It is to be noted that this invention is not limited to the use of two tilted or untilted positive cylindrical lenses used in the orientation shown in FIGS. 7, 9 and 10. Depending on the nature of the geometry of the application, said cylindrical lenses may have negative power and/or be rotated through 90 degrees in order to effect the tilt of the other focal surface. Said cylindrical lenses may also have positive or negative tilts depending on the tilt affect on the focal surface desired in the application. Neither is this invention limited to a single cylindrical element in either or both of the construction beams, the same affect being obtainable with a multitude of cylindrical lenses in each beam. It is only to be noted that one cylindrical element in each beam is sufficient to obtain the desired tilt of one focal surface relative to the other in this illustrated example.

Figure 11:
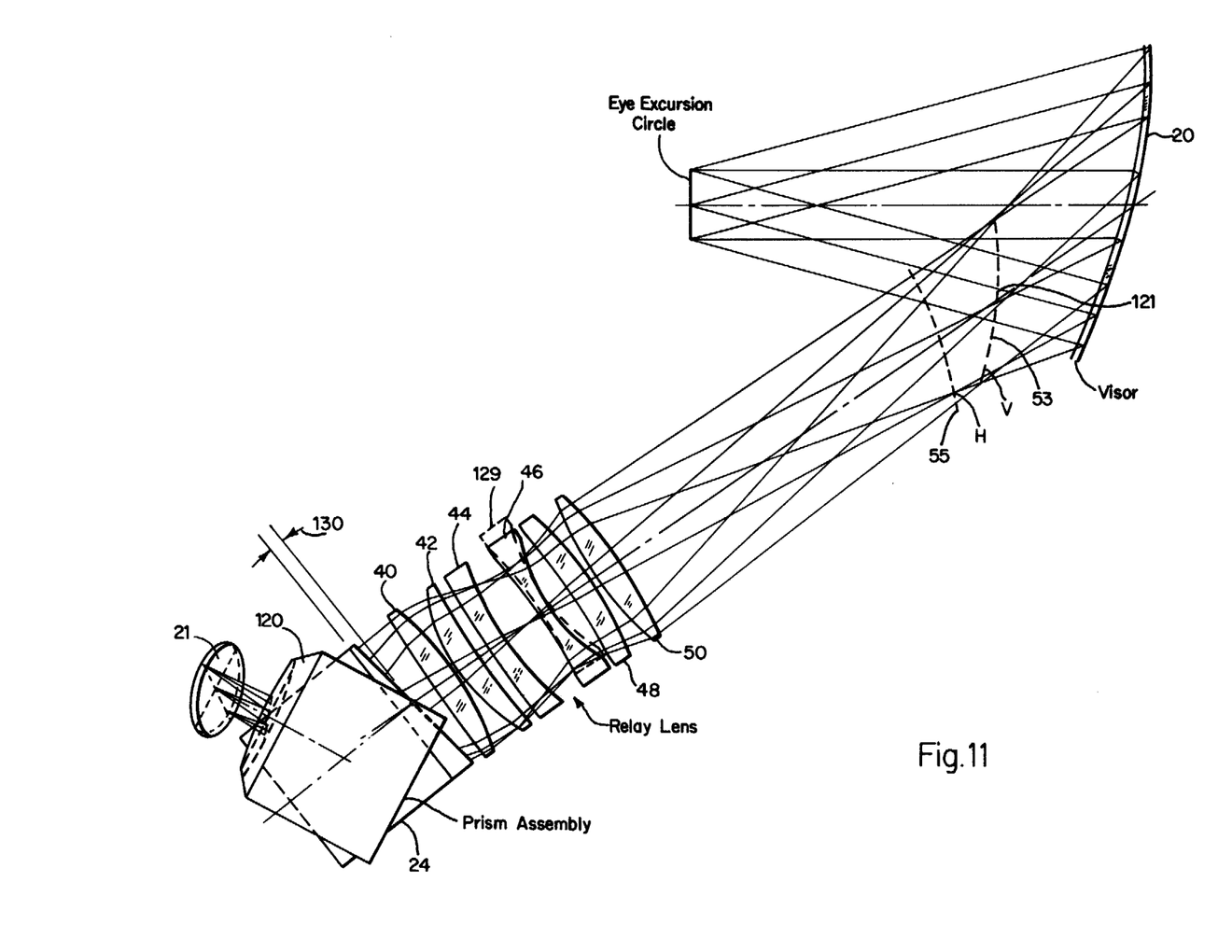
FIG. 11 is a top view showing further detail of the optics and the traced rays in the helmet-mounted display system in accordance with the invention.
Figure 12:
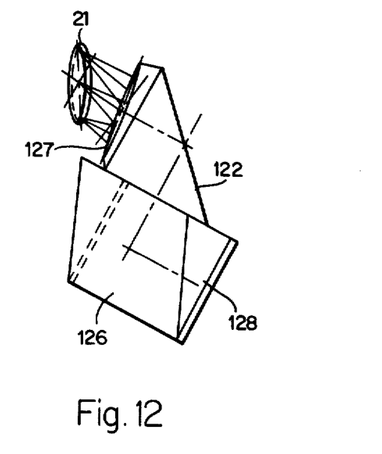
FIG. 12 is a view taken at line 12–12 of FIG. 11 for explaining the prism assembly.
Figure 13:
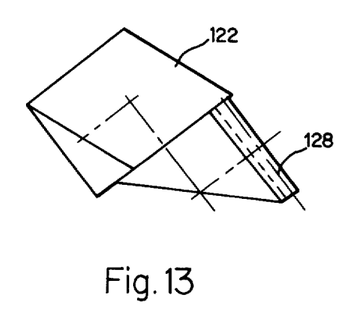
FIG. 13 is a view taken at line 13 of FIG. 11 for further explaining the prism assembly.
Figure 14:
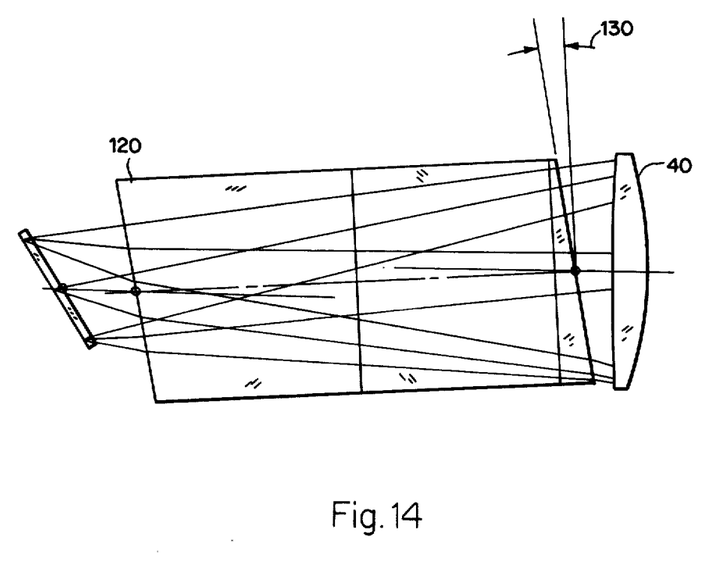
FIG. 14 is a schematic diagram of the equivalent optical path of the prism assembly of FIG. 8.

Referring now to FIG. 11, the optical layout of the helmet-mounted display showing the path of the rays is given. As described previously, the axial coma is corrected in the system by tilting the prism assembly. The axial coma may also be corrected by tilting and/or decentering elements in the relay lens as indicated by the displacement 129 of the central negative lens 44 shown dashed in FIG. 11. Two other views of the prism assembly are shown in FIGS. 12 and 13. These figures, in conjunction with FIG. 14, show that the prism assembly is comprised of an upper right angle prism 122, a lower right angle prism 126 and two wedges 127 and 128. The right angle prisms 122 and 126 form a periscope arrangement in which the upper prism 122 is rotated about the axial ray in order to fold the object surface 21 and CRT 22 close to the helmet 16. The two wedges 127 and 128 provide the effective tilt angle 130 of the prism assembly which is the optical equivalent of a tilted glass plate as shown in FIG. 14. The tilt angle 23 of the object plane 21 relative to the normal to the axial ray is also shown in FIG. 14.

Figure 15:
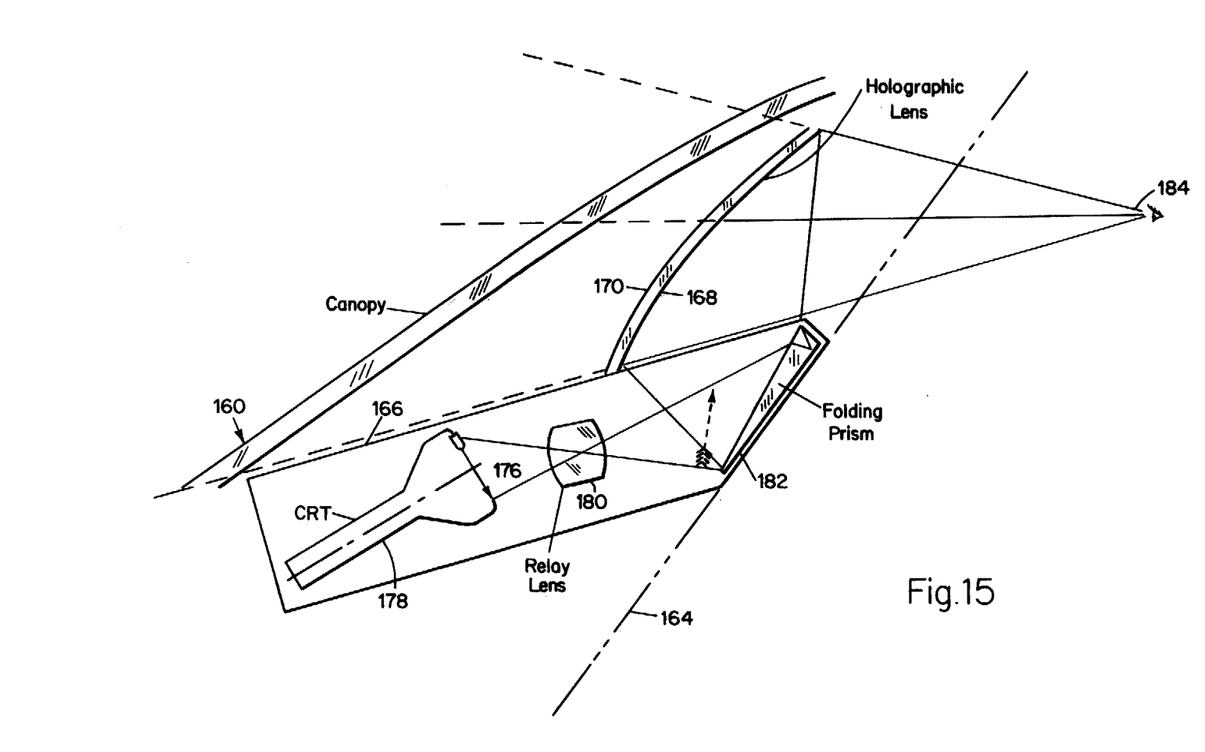
FIG. 15 is a schematic diagram of an arrangement of a head-up display system utilizing the principles of the invention.

Referring now to FIG. 15, the principles of the invention incorporated in a holographic lens head-up display for an aircraft 160 will be explained. The aircraft has a canopy 162 and a top surface 166 and an ejection line 164 that provides a limitation on the head-up display configuration. A holographic lens 168 is positioned on a substrate 170 which may be a suitable transparent material such as Plexiglas. The object plane is a surface 176 on a cathode ray tube 178. The object plane is imaged through a relay lens 180 to a folding prism 182 having a surface angled to direct the rays over the surface of the halographic lens 168. The rays are then diffracted from the holographic lens 168 to the eye 184 which is the exit pupil for the display. The view from the exit pupil 184 is to the outside scene with the display from the surface 176 appearing as a virtual image at infinity.

Figure 16:
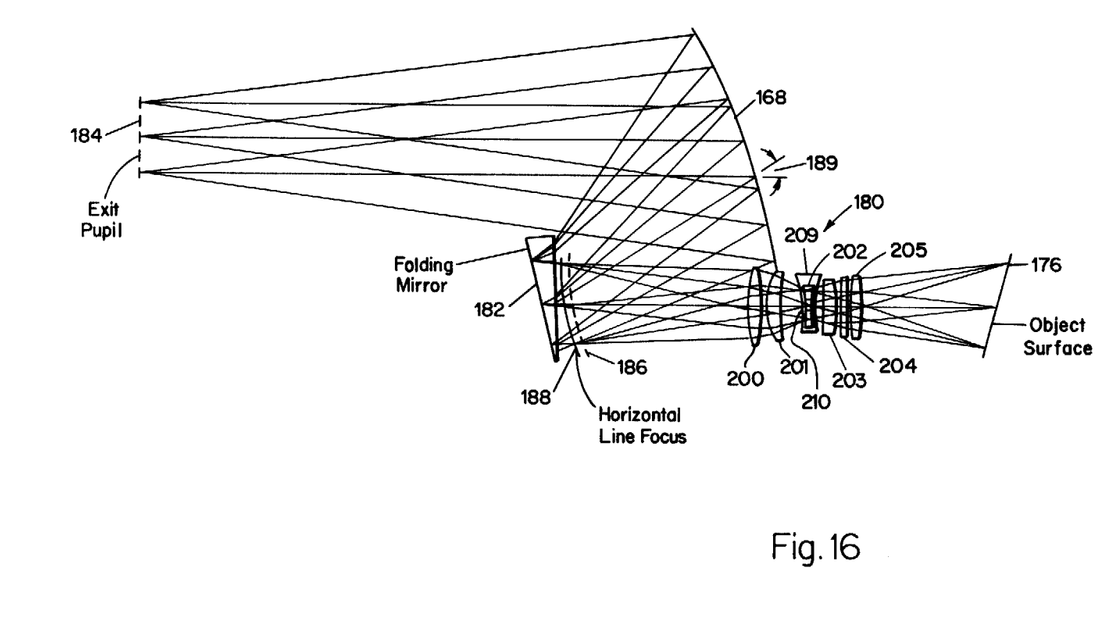
FIG. 16 is a schematic ray trace diagram of a vertical section of the head-up display system in accordance with the invention.
Figure 17:
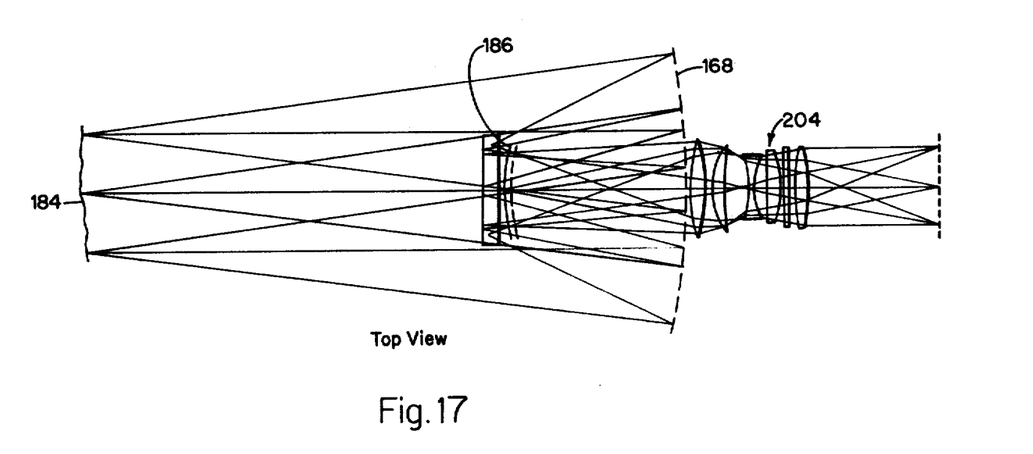
FIG. 17 is a schematic ray trace diagram of a horizontal section of the head-up display configuration of FIG. 16.

Referring now to the ray trace diagrams of FIGS. 16 and 17, it is seen that the rays from the object surface 176 are imaged through the relay lens at an intermediate image which has a horizontal line focus 188 and a vertical line focus 186. This intermediate image is located at the focus of the holographic lens 168 as seen through the prism 182. The final image viewed by the eye at the exit pupil 184 is at infinity and of high quality. The field of view may be large, and is 15° × 200° in the illustrated example being primarily limited by the size of holographic lens that will fit within the cockpit geometry. The exit pupil may also be large being 3 × 5 inches in the illustrated example. It is to be noted that the system has bisymmetry about a vertical plane containing the axial ray of the system. It is also to be noted that the normal to the holographic lens bisects the off-axis angle 189 at which the holographic lens operates. This bisecting of the off-axis angle aspect of the geometry is not a part of the invention, being well known in the art in that it is a geometry that minimizes the aberrations in the holographic lens, most notably chromatic aberration, axial astigmatism and axial coma. In the illustrated arrangement of FIG. 16, there is comparatively little axial astigmatism and axial coma. Nevertheless, these aberrations have to be corrected in the relay lens. Further, the tilts of the intermediate image have to be matched by adjusting the design parameters of the holographic lens and by tilting the object surface as was done in the helmet-mounted display of FIG. 11.

In FIGS. 16 and 17, the relay lens 180 includes positive spherical lens elements 200, 201, 203 and 205, a negative spherical element 202 and a negative cylindrical element 204. The curvatures of the negative cylindrical element are in the side view of FIG. 16, but it is within the scope of this invention that this element may be positive with its cylindrical curvatures in the top view of FIG. 17. The cylindrical element 204 corrects the residual axial astigmatism in the holographic lens. It is to be noted that this element 204 can be replaced by a cylindrical surface on one or more of the positive spherical elements in the relay lens. The axial coma is best corrected in the illustrated arrangement by a decentration 210 of the negative spherical lens 202 shown as a dashed lens 209 in FIG. 13. It is to be noted that any axial coma can also be corrected by decentering any appropriate lens in the relay lens 180.

The prism 182 also provides a partial correction to the axial coma, but this is not its main purpose. The prism is a wedge with a mirror on its rear surface and is located close to the intermediate image. Rays image at the top of the intermediate image traverse a thicker wedge of glass than those imaged at the bottom of the intermediate image. This considerably reduces the tilt of both the intermediate image focal surfaces, and hence also reduces the tilt of the object surface. The final tilt of the object surface in the illustrated configuration is about 15 degrees, but would be over 30 degrees if the prism were not used.

Figures 18A, 18B:
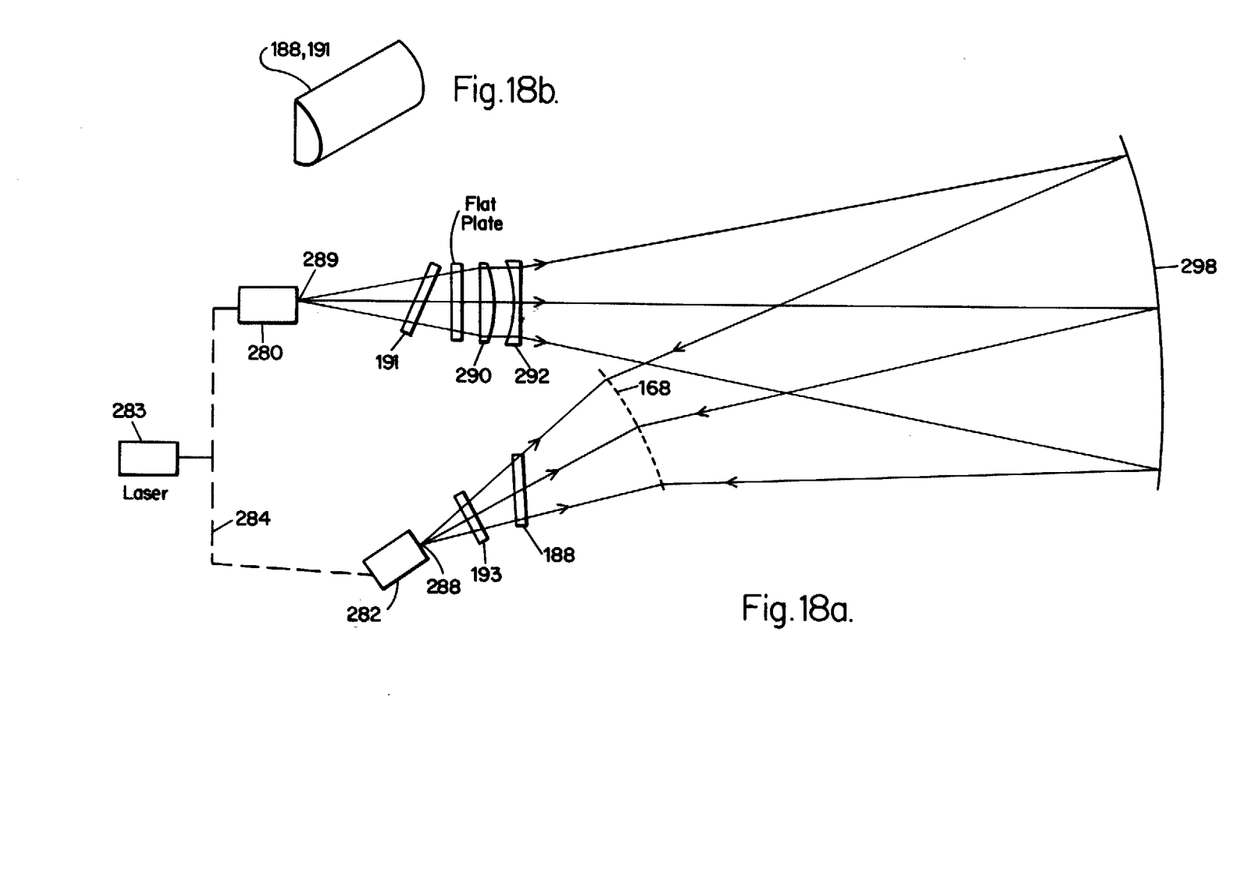

Referring now to FIGS. 18a and 18b, the optics used to construct the holographic lens used in the head-up display arrangement of FIGS. 16 and 17 will be described. The wavefronts used in the construction of the holographic lens are obtained from the two mutually coherent point sources 288 and 289, termed the object and reference beam point sources, respectively. These sources may be derived from the same laser 283 by means of suitable optical means including beamsplitting techniques, microscope objectives and spatial filters as indicated by 280, 282 and the line 284 joining 280 and 282. The object beam point source 288 is located close to the desired hologram exit pupil. The reference beam point source is imaged via the two cylindrical lenses 290 and 292 and off-axis spherical mirror 298, at a point located close to the desired entrance pupil to the holographic lens. This point 289 corresponds to the exit pupil of the relay lens 180 (FIG. 16) and is located close to the center of the relay lens in order to minimize the relay lens diameter. It should be noted that elements 290, 292 and 298 are used only to obtain a reference beam wavefront which illuminates the large holographic lens substrate and converges on the desired location of the holographic lens entrance pupil. The cylindrical lenses 290 and 292 correct astigmatism in the off-axis spherical mirror. The cylindrical lens 292 is also tilted to correct coma in the off-axis spherical mirror. The principles of this invention are not limited to the particular optical means used to obtain the convergent reference beam wavefront as described in the illustrated example.

It is also to be noted that there is a tilt to both the horizontal and the vertical line focus, and that these two tilts have to match the two tilts of the intermediate image which correspond to a single tilt of the object plane 176. In accordance with this invention, the tilt of the horizontal line focal surface 188 may be tilted relative to the tilt of the vertical line focus 186 by means of constructing the holographic lens with aberrated wavefronts. In FIG. 18a, this construction may be done by means of placing a tilted cylindrical lens 188 and 191 in each construction beam. In the described arrangement, the cylindrical lenses 188 and 191 have no power in the side view of FIG. 18a and therefore do not appreciably effect the tilt of the horizontal line focus. However, the lenses do have power in the top views as can be seen by the lens of the perspective view of FIG. 18b representing lens 188 and 191, so the tilt of the vertical line focus 186 is adjusted. As noted for the helmet-mounted display of FIG. 11, the principles of this invention are not limited to cylindrical lenses of positive power and in the orientation shown. Depending on the arrangement, it can be expedient to also use negative cylindrical lenses, and the cylindrical lenses, positive or negative, may be rotated through 90° in order to effect the tilt of the other focal surface.

Thus there has been provided optical display systems utilizing holographic lenses that allow increased flexibility in the selection of image forming geometry and the location of the major components within the aircraft or the flight helmet. This improvement is made possible because image formation in the holographic lens occurs by diffraction rather than refraction. Single exposure holographic lenses have operated with quality only over a very small field of view in conventional systems. However in the holographic display systems in accordance with the invention the operation covers a very large field of view such as for example 30° or more by purposely aberrating the wavefronts used during the construction of the hologram lens and by introducing optical elements to further correct the image upon playback. The virtual image produced in some arrangements in accordance with the invention is monochromatic and in the helmet-mounted display may originate in a miniature cathode ray tube such as one of one inch diameter and having a narrow wavelength band phosphor and in the head-up display may be a relatively large cathode ray tube. Intermediate image tilt adjustment is introduced in the holographic lens construction by tilted cylindrical lenses in the two construction beams. The axial coma aberration is corrected by a tilt in the optical path such as in the prism structure which is effectively a tilted glass plate or alternatively, for example by tilting or decentering one of the lenses in the relay lens. The correction for the axial astigmatism in the holographic lens is provided by the use of cylindrical lenses in the relay lens, the correction being in the horizontal plane for horizontal fans of rays in the illustrated helmet-mounted display and being in the vertical plane for vertical fans of rays in the illustrated head-up display. It is to be understood that the concepts of the invention are equally applicable to any type of system and the helmet-mounted display and the head-up display are only illustrative examples of new and improved systems incorporating the concepts of the invention. Thus the system of the invention in some arrangements of the invention provides an improved virtual image to the observer appearing at infinity while allowing a clear vision through the holographic lens to the outside scene, if this view is desired in the system.

What is claimed is:

1. A display system having a holographic lens constructed with two coherent sources located relatively close to entrance and exit pupils thereof, and which deviates the axial ray coming from an object surface through an off-axis angle into an exit pupil and which has a focal surface with axial coma and axial astigmatism, said display system having
    first means along said axial ray between said object surface and said holographic lens to compensate said axial coma, and
    second means along said axial ray between said object surface and said holographic lens to compensate said axial astigmatism.

2. The display system of claim 1 in which said first means is prism means including first and second prisms with first and second wedges attached thereto to provide the optical equivalent of a tilted glass plate.

3. The display system of claim 1 in which said second means is a lens assembly including lens means having cylindrical surfaces with a cylindrical curvature in a selected plane normal to said axial ray.

4. The display system of claim 2 in which said second means is a lens assembly including lens means having cylindrical surfaces with a cylindrical curvature in a selected plane substantially normal to said axial ray.

5. The display system of claim 3 in which said cylindrical lenses are structured to provide a negative axial astigmatism.

6. The display system of claim 3 in which said cylindrical lenses are structured to provide a positive axial astigmatism.

7. The display system of claim 1 in which said first means includes a lens decentered from the axial ray in a plane selected to compensate said axial coma.

8. The display system of claim 1 in which said first means includes a lens tilted from the normal to the axial ray in a plane selected to compensate said axial coma.

9. The display system of claim 4 in which the lens assembly of said second means includes first, second, third and fourth cylindrical surfaces forming in combination said compensating axial astigmatism.

10. The display system of claim 1 in which a tilted folding prism is included along said axial ray for providing a correction of axial coma.

11. The combination of claim 1 in which the holographic lens is formed on a helmet visor.

12. Holographic lens construction apparatus used to construct a reflective holographic lens with aberrated wavefronts in order to compensate for the variation of astigmatism across the field of view which otherwise arises because the two focal surfaces of said holographic lens would be incorrectly tilted relative to one another, said holographic lens construction optics comprising
a holographic lens recording material on a substrate,
a source of a first laser wavefront incident on said holographic lens recording material, which is divergent from a point source located close to the desired exit pupil of the holographic lens, and is aberrated by passing through tilted cylindrical lenses, and
a source of a second laser wavefront incident on said holographic lens recording material from the opposite side as the first laser wavefront, and which is coherent with the first wavefront, is convergent on a point close to the desired entrance pupil of said holographic lens and is aberrated by passing through tilted cylindrical lenses.

13. The holographic lens construction optics of claim 12 in which the first and second wavefronts are centered on points located a substantial distance from the desired holographic lens entrance and exit pupils.

14. The holographic lens construction optics of claim 12 in which the first laser wavefront incident on the holographic lens recording material is convergent.

15. The holographic lens construction optics of claim 12 in which the second laser wavefront incident on the holographic lens is divergent.

16. The holographic lens construction optics of claim 12 in which the two wavefronts are incident on the holographic lens recording material from the same side in order to construct a holographic lens which operates in the transmission mode.

17. Holographic lens construction apparatus used to construct a reflective holographic lens with aberrated wavefronts in order to compensate for the variation of astigmatism across the field of view which otherwise arises because the two focal surfaces of said holographic lens would be incorrectly tilted relative to one another, said holographic lens construction apparatus comprising
first and second tilted cylindrical lenses,
a holographic lens recording material on a substrate,
a source of a first laser wavefront incident on said holographic lens recording material, which is divergent from a point source located close to the desired exit pupil of the holographic lens, and is aberrated by passing through said first tilted cylindrical lens, and
a source of a second laser wavefront incident on said holographic lens recording material from the opposite side as the first laser wavefront, and which is coherent with the first wavefront, is convergent on a point close to the desired entrance pupil of said holographic lens, and is aberrated by passing through said second tilted cylindrical lens.

18. The holographic lens construction optics of claim 17 in which the first and second wavefronts are centered at locations a substantial distance from the desired holographic lens entrance and exit pupils.

19. The holographic lens construction optics of claim 17 in which the first laser wavefront incident on the holographic lens recording material is convergent.

20. The holographic lens construction optics of claim 12 in which the second laser wavefront incident on the holographic lens is divergent.

21. The holographic lens construction optics of claim 17 in which the two wavefronts are incident on the holographic lens recording material from the same side in order to construct a holographic lens which operates in the transmission mode.

22. The holographic lens construction optics of claim 17 in which the cylindrical lenses are parallel to said first and second wavefronts.

23. The holographic lens construction optics of claim 17 in which said cylindrical lenses are positioned in only a selected one of the two beams incident on the holographic lens.

24. The holographic lens construction optics of claim 17 in a helmet-mounted display wherein the holographic lens is an integral part of the visor, the axial astigmatism is compensated for by means of cylindrical surfaces in a relay lens, the axial coma is compensated by means of a tilted prism assembly, and the variation of astigmatism across the field is corrected by cylindrical lenses selected to adjust the powers and tilts in said construction optics so that the two tilts of the two holographic lens focal surfaces may be simultaneously matched in playback by a single tilt of an object surface.

25. The holographic lens construction optics of claim 17 in a head-up display wherein the holographic lens is an integral part of the visor, the axial astigmatism is compensated for by means of cylindrical surfaces in a relay lens, the axial coma is compensated by means of a tilted prism assembly, and the variation of astigmatism across the field is corrected by cylindrical lenses selected to adjust the powers and tilts in said construction optics so that the two tilts of the two holographic lens focal surfaces may be simultaneously matched in playback by a single tilt of an object surface.

* * * * *